United States Patent
Ostwald

(10) Patent No.: US 6,386,116 B1
(45) Date of Patent: May 14, 2002

(54) PROPULSION DECOUPLING METHOD AND SYSTEM FOR MULTIPLE TRACK MOUNTED ROBOTS OF AN AUTOMATED STORAGE LIBRARY

(75) Inventor: Timothy C. Ostwald, Lousiville, CO (US)

(73) Assignee: Storage Technology Corporation, Louisville, CO (US)

( * ) Notice: Subject to any disclaimer, the term of this patent is extended or adjusted under 35 U.S.C. 154(b) by 0 days.

(21) Appl. No.: 09/602,936

(22) Filed: Jun. 23, 2000

(51) Int. Cl.[7] ............................................. B60L 15/42
(52) U.S. Cl. ........................... 104/287; 360/92; 414/4; 192/143
(58) Field of Search ................................ 360/92, 98.04, 360/98.06; 414/4, 281; 104/287, 159, 211; 192/143, 89.21

(56) References Cited

U.S. PATENT DOCUMENTS

| | | | |
|---|---|---|---|
| 4,307,341 A | * 12/1981 | Benbow et al. | ............. 324/103 |
| 4,379,530 A | * 4/1983 | Kobayashi | ................. 242/220 |
| 4,396,102 A | * 8/1983 | Beach | ..................... 192/99 S |
| 4,520,971 A | * 6/1985 | Nagata | ..................... 242/220 |
| 4,658,944 A | * 4/1987 | Kogure et al. | ......... 192/84 PM |
| 4,796,479 A | * 1/1989 | Wisecarver | .................. 74/398 |
| 4,937,690 A | 6/1990 | Yamashita et al. | |
| 5,289,589 A | 2/1994 | Bingham et al. | |
| 5,377,121 A | 12/1994 | Dimitri et al. | |
| 5,432,416 A | * 7/1995 | Tae-Sig | ................. 318/568.12 |
| 5,497,057 A | 3/1996 | Danielson et al. | |
| 5,818,723 A | 10/1998 | Dimitri | |
| 5,894,461 A | 4/1999 | Fosler et al. | |
| 5,898,593 A | 4/1999 | Baca et al. | |
| 5,914,919 A | 6/1999 | Fosler et al. | |
| 5,970,030 A | 10/1999 | Dimitri et al. | |
| 6,262,863 B1 | * 7/2001 | Ostwald et al. | ............... 360/92 |

* cited by examiner

Primary Examiner—S. Joseph Morano
Assistant Examiner—Frantz F. Jules
(74) Attorney, Agent, or Firm—Brooks & Kushman P.C.

(57) ABSTRACT

A robotic mechanism for an automated storage library having media cartridge storage cells each housing a media cartridge includes drive wheels operable to ride on tracks of the automated storage library to access the media cartridges in the media cartridge storage cells, a drive mechanism for driving the drive wheels, and a clutch mechanism for disconnecting the drive mechanism from the drive wheels to enable the robotic mechanism to be pushed by an external force along the tracks when the robotic mechanism is disabled and unable to move.

8 Claims, 6 Drawing Sheets

PROPULSION DECOUPLING METHOD AND SYSTEM FOR MULTIPLE TRACK MOUNTED ROBOTS OF AN AUTOMATED STORAGE LIBRARY

TECHNICAL FIELD

The present invention relates generally to robotic mechanisms that move about tracks for manipulating media in an automated media storage library system and, more particularly, to a method and system for decoupling driving means from driving wheels of a disabled robotic mechanism in the storage library to enable the disabled robotic mechanism to be freely pushed or pulled along the tracks.

BACKGROUND ART

Existing automated storage libraries are capable of storing and retrieving large quantities of information stored on media cartridges. This is accomplished by the use of a large number of cartridge storage cells, each of which houses a media cartridge, that are housed within an enclosure. Such storage libraries use a robotic mechanism or picker to quickly move the media cartridges between their media cartridge storage cells and media cartridge players. For example, to retrieve information that is stored on a selected media cartridge, a robotic mechanism moves to a location opposite the media cartridge storage cell that houses the selected media cartridge. An end effector of the robotic mechanism then grasps the media cartridge and extracts it from the media cartridge storage cell to a media player where the end effector loads the media cartridge into the media player.

A typical storage library includes tracks or rails laid out throughout the storage library. Robotic mechanisms are mounted to the tracks to move throughout the storage library to access the media cartridges and the media cartridge player. The robotic mechanisms include drive or propulsion mechanisms coupled to driving wheels. The driving wheels ride in the tracks and are driven by the drive mechanism to rotate and move the robotic mechanism along the tracks. A problem occurs when the driving mechanism of a robotic mechanism is disabled. A disabled driving mechanism causes the robotic mechanism to be unable to move and become stuck on the tracks. The disabled robotic mechanism needs to be removed from the tracks when service is required to allow other robotic mechanisms to traverse the tracks without being obstructed by the disabled robotic mechanism for accessing the media cartridges.

SUMMARY OF THE INVENTION

Accordingly, it is an object of the present invention to provide a method and system for decoupling driving means from driving wheels of a disabled robotic mechanism in an automated storage library to enable the disabled robotic mechanism to be moved along the tracks of the automated storage library to a service area.

It is another object of the present invention to provide a method and system for enabling an operator to decouple driving means from driving wheels of a disabled robotic mechanism in an automated storage library to enable the operator to push or pull the disabled robotic mechanism along the tracks of the automated storage library to a service area.

It is a further object of the present invention to provide a method and system for enabling an operable robotic mechanism to decouple driving means from driving wheels of a disabled robotic mechanism in an automated storage library to enable the operable robotic mechanism to push or pull the disabled robotic mechanism along the tracks of the automated storage library to a service area.

In carrying out the above objects and other objects, the present invention provides a robotic mechanism for an automated storage library having media cartridge storage cells each housing a media cartridge. The robotic mechanism includes drive wheels operable to ride on tracks of the automated storage library to access the media cartridges in the media cartridge storage cells, a drive mechanism for driving the drive wheels, and a clutch mechanism for disconnecting the drive mechanism from the drive wheels.

In carrying out the above objects and other objects, the present invention further provides a method for operating an automated storage library having a plurality of media cartridge storage cells each housing a media cartridge. The method includes providing a robotic mechanism having drive wheels for moving along tracks of the automated storage library to access the media cartridges in the media cartridge storage cells. The drive wheels are then driven using a drive mechanism. A clutch mechanism is then actuated to disconnect the drive mechanism from the drive wheels.

The advantages associated with the present invention are numerous. The method and system of the present invention decouple driving means from driving wheels of a disabled robotic mechanism in an automated storage library to enable the disabled robotic mechanism to be moved in either direction along tracks of the automated storage library to a service area. The present invention enables disabled robotic mechanisms to automatically be moved to service areas for service thereby improving library system online time. The present invention also enables disabled robotic mechanisms to be removed from the library system to allow operable robotic mechanisms to access the media cartridges without any obstructions.

The above objects and other objects, features, and advantages of the present invention are readily apparent from the following detailed description of the best mode for carrying out the present invention when taken in connection with the accompanying drawings.

BEST MODES FOR CARRYING OUT THE INVENTION

Figure 1:
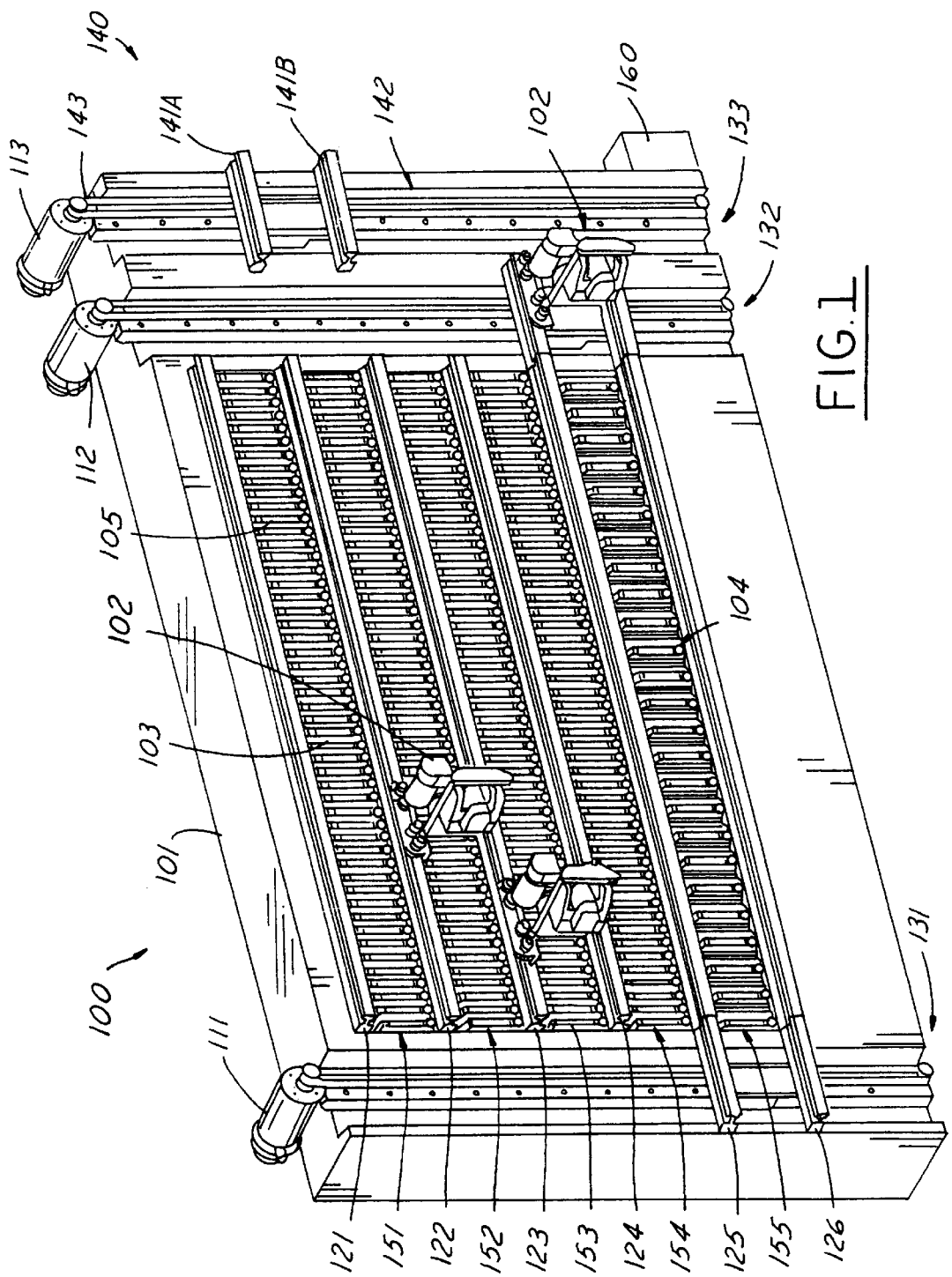
FIG. 1 illustrates a perspective view of an automated storage library system in accordance with the present invention.

Referring now to FIG. 1, an automated storage library 100 for use with the present invention is shown. Storage library 100 includes multiple independent robotic mechanisms (robotic pods) 102 to enable library system 100 to concurrently manipulate multiple media cartridges 105. Storage library 100 includes a two-dimensional vertical standing array of media cartridge storage cells 103 and media cartridge players 104 that are mounted in a frame 101. A system of tracks or rails 121–126 is used to guide robotic pods 102 through all of the locations in the array. Robotic pods 102 contain a movable carriage that is capable of transporting robotic components, such as media cartridge pickers, bar code reading devices, and other task oriented sub-modules on tracks 121–126 of storage library 100.

Frame 101 is designed to receive a plurality of rows 151–155 of media cartridge storage cells 103 each of which is designed to house a single media cartridge 105. Media cartridge players 104 are shown in an arbitrary location in a horizontal row 155 at the bottom of frame 101, although storage library 100 can incorporate media cartridge players 104 at any location in frame 101 to optimize performance. Robotic pods 102 are attached to frame 101 via horizontal guide tracks or rails 121–126 which serve to frame media cartridge storage cells 103 and media cartridge players 104 on the top and bottom sides thereof. Storage library 100 includes an array of media storage cells 103 fully populated with media cartridges 105 of any arbitrary type. Tracks 121–126 provide support of robotic pods 102 in the vertical direction to oppose the force of gravity, and they also provide a meshing surface of a suitable design to impart traction in the horizontal direction for motive transport of the robotic pods. Robotic pods 102 each incorporate drive means for propulsion in the horizontal direction along guide tracks 121–126.

Storage library 100 further includes vertical elevator assemblies 131–133 that enable the transfer of robotic pods 102 in the vertical direction. Each of vertical assemblies includes a set of vertical rails 142 that extend substantially from the top of frame 101 to the bottom of the frame. Vertical rails 142 support elevator stations 140 each of which contain short horizontal track segments 141A, 141B that are identical in cross section to the main horizontal guide tracks 121–126. Elevator stations 140 are held in suspension by drive belts 143 which wrap around a respective drive pulley attached to a respective vertical drive motor 111–113. When a vertical displacement is required of any robotic pod 102, vertical elevator 140 is scheduled to move in alignment to the appropriate level of rows 151–155 to allow transfer of the robotic pod onto the elevator track segments 141A, 141B from the pair of horizontal tracks 121–126 that are juxtaposed and abutting to elevator track segments 141A, 141B. Once robotic pod 102 is located on elevator station 140, drive motor 113 is activated to transport robotic pod 102 to a selected one of rows 151–155 and thence moves on to the pair of horizontal tracks 121–126 that correspond to the selected row.

A storage library control unit (controller) 160 provides commands to robotic pods 102 and elevator stations 140 to manipulate media cartridges 105. Controller 160 communicates with each robotic pod 102 individually by radio frequency communication links, infrared communication links, or other wireless links. Wired communication links may be [use] used if only a few robotic pods 102 are used in storage library 100 and their paths are simple to keep the wires from becoming entangled with each other. Commands to robotic pods 102 include movement along tracks 121–126, movement of media cartridges 105 into and out of the robotic pods, reading bar codes on the media cartridges, and the like.

Controller 160 and robotic pods 102 are operable with one another such that the controller knows the position of the robotic pods within storage library 100 as they move about tracks 121–126. This is accomplished by mounting position sensors on robotic pods 102 which provide information regarding the position of the robotic pods to controller 160. This may also be accomplished by providing sensors on tracks 121–126 which are actuated to transmit a signal to controller 160 when a robotic pod 102 traverses a sensor on tracks 121–126. This may further be accomplished by having robotic pods 102 provide information regarding the speed and direction of their travels through storage library 100.

Communications between controller 160 and elevator motors 111–113 is typically provided by direct wiring. Commands from controller 160 to each of elevator motors 111–113 include at least moving elevators 140 up and down and holding the elevators in position. Each elevator motor 111–113 is controlled independently of the other elevator motors.

Controller 160 may also be in communication with media cartridge players 104. In one embodiment, controller 160 provides commands to mount and dismount media cartridges 105 into and out of media cartridge players 104. Controller 160 coordinates these commands with positioning commands to a robotic pod 102 that supplies or receives a media cartridge 105 to and from a media cartridge player 104. In another embodiment, an external source (not shown) provides the mount and dismount commands directly to media cartridge players 104. Here, controller 160 coordinates with the external source to position the proper robotic pod 102 adjacent media cartridge player 104 prior to the mount or dismount command being given to the media cartridge player.

Figure 2:
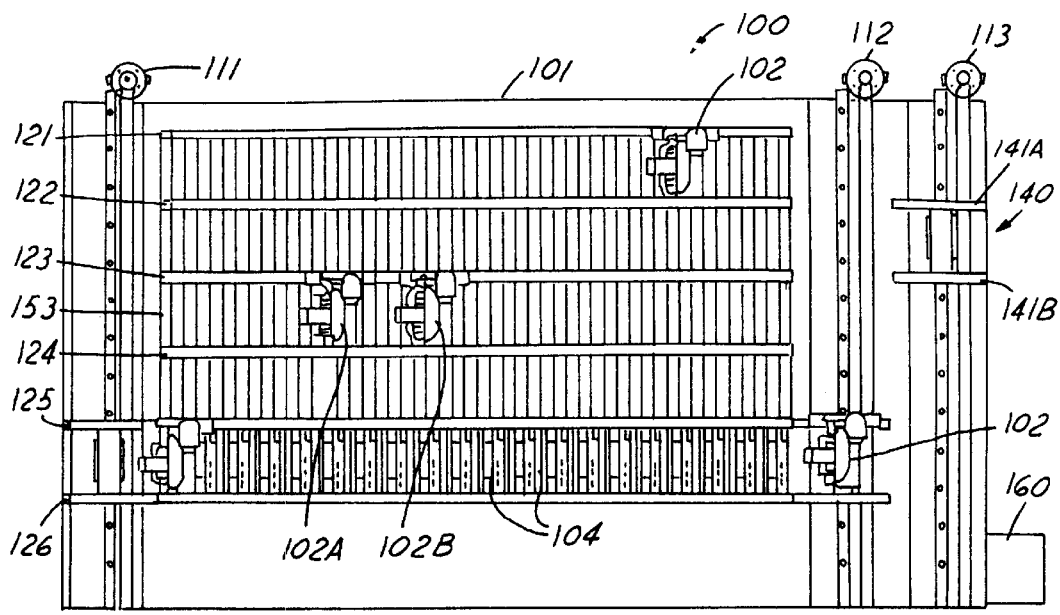
FIG. 2 illustrates a frontal view of the automated library system in which two robotic mechanisms are located on the same track level.

Referring now to FIG. 2, a front view of storage library 100 is shown. This view illustrates two robotic pods 102A, 102B operating on the same track level within storage library 100. Robotic pods 102A, 102B move along guides 123, 124 to access media cartridges 105 contained in row 153 of the media cartridge storage cells. Robotic pods 102A, 102B may move towards one another in conjunction with instructions from controller 160. Usually, one robotic pod, e.g. robotic pod 102A, will move back to allow the other robotic pod, e.g., robotic pod 102B, to move toward robotic pod 102A and access media cartridges 105 without interfering with robotic pod 102A.

In accordance with an aspect of the present invention, a robotic pod may be moved towards a disabled robotic pod on the same track level to push or pull the robotic pod along the tracks for servicing at a service location. To do this, the drive means of the disabled robotic pod is disconnected from the driving wheels to enable free travel of the disabled robotic pod along the tracks as explained in greater detail below. The properly functioning robotic pod may then be moved towards and engage the disabled robotic pod to either push or pull the disabled robotic pod along the tracks to the service location. Of course, if an operator has access to the disabled robotic mechanism the operator can move the disabled robotic mechanism along the tracks to the service location after the drive means of the disabled robotic mechanism is disconnected from the drive wheels.

Figure 3:
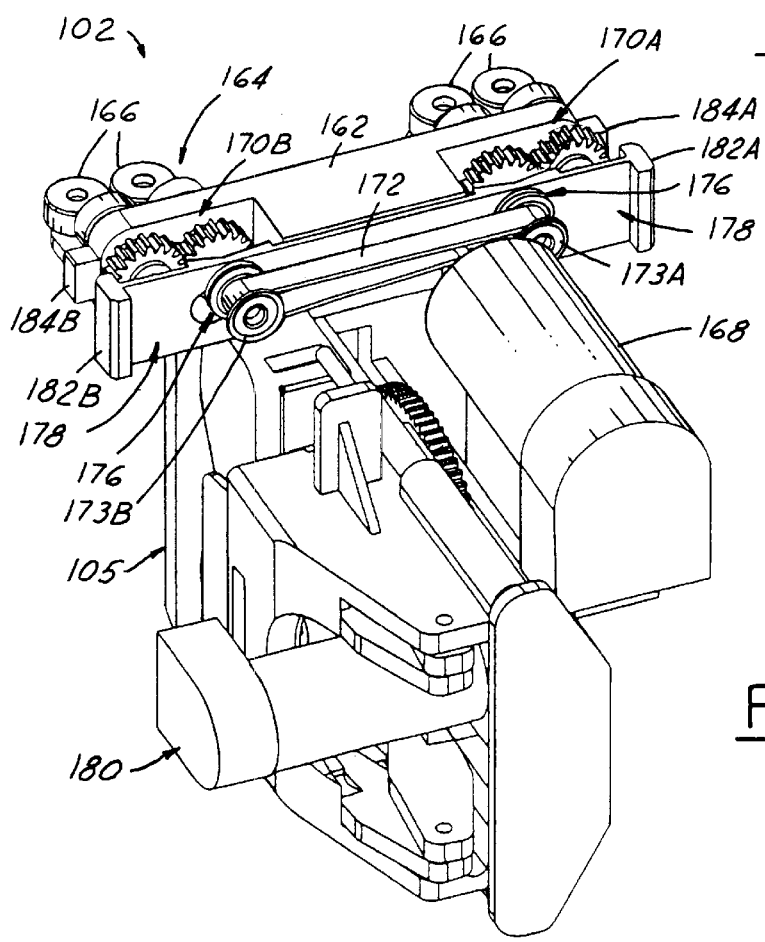
FIG. 3 illustrates a perspective view of a robotic mechanism in accordance with the present invention.

Referring now to FIG. 3, a perspective view of a robotic pod 102 for riding on tracks 121–125 is shown. Robotic pod 102 includes a robotic pod base assembly having a frame 162 for structural support. Frame 162 suspends in a track by drive wheels 164 that ride in a main groove provided in the tracks. Preferably, the robotic pod base assembly includes two pairs of drive wheels 164. Rotation of drive wheels 164 causes robotic pod 102 to move along a track of storage library 100. Drive wheels 164 rotate clockwise and counterclockwise to allow robotic pod 102 to move in both directions along a track of storage library 100. Idler wheels 166 are rotatably mounted in frame 162. Idler wheels 166 move in additional grooves provided in the tracks. Idler wheels 166 help orient and guide robotic pod 102 with respect to media cartridge storage cells 103 and media cartridge players 104.

Robotic pod 102 also includes a track propulsion drive motor or mechanism 168 for driving drive wheels 164 to move the robotic pod along the tracks of storage library 100. Drive mechanism 168 is operable to drive two pairs of drive gears 170A, 170B and belt 172 that interconnects the pairs of drive gears for driving drive wheels 164. Belt 172 wraps around a pair of drive pulleys 173A, 173B. Each drive pulley 173A, 173B is coupled to a respective one of the pair of drive gears 170A, 170B. Rotation of drive pulleys 173A, 173B by belt 172 and drive mechanism 168 causes the pairs of drive gears 170A, 170B to rotate. Each drive wheel 164 is also coupled to a respective one of the pair of drive gears 170A, 170B. Rotation of drive gears 170A, 170B causes drive wheels 164 to rotate for moving robotic pod 102. Drive mechanism 168 includes a drive shaft 174 operable for driving drive belt 172 and drive pulleys 173A, 173B.

Robotic pod 102 further includes a gripper mechanism 180. Gripper mechanism 180 is operable to move to an extended position to grasp a media cartridge 105 and to move back to a retracted position to pull the media cartridge into robotic pod 102 to enable transportation of the selected media cartridge to a designated location by the movement of the robotic pod.

Robotic pod 102 further includes a clutch mechanism 176 for disconnecting drive mechanism 168 from drive wheels 164 when robotic pod 102 is disabled. Clutch mechanism 176 disconnects drive mechanism 168 from drive wheels 164 to enable disabled robotic pod 102 to be moved by an external force along the tracks of storage library 100. Disconnecting drive mechanism 168 from drive wheels 164 allows free travel of robotic pod 102 along the tracks of storage library 100. An operator, if allowed access to robotic pod 102, can actuate clutch mechanism 176 and then move the robotic pod along the tracks of storage library 100 to a service point. In a storage library having multiple robotic pods a second robotic pod can come up against the disabled robotic pod, actuate clutch mechanism 176, and then push or pull the disabled robotic pod along the tracks of the storage library to a service point.

Clutch mechanism 176 includes a push bar and clutch actuation lever 178. Push bar and clutch actuation lever 178 slides between an engaged position and disengaged positions for respectively engaging and disengaging drive mechanism 168 from drive wheels 164. To disengage drive mechanism 168 from drive wheels 164 push bar and clutch actuation lever is slid from the engaged position to a disengaged position. Preferably, the engaged position of push bar and clutch actuation lever 178 is a middle position and the disengaged positions are longitudinally left and right of the engaged position. Sliding push bar and clutch actuation lever 178 from either side of the middle engaged position causes the clutch actuation lever to be slid to a disengaged position. This enables push bar and clutch actuation lever 178 to be slid to a disengaged position by another robotic pod on either side of robotic pod 102. Push bar and clutch actuation lever 178 provides pushing surfaces 182A, 182B at each end for the other robotic pod to push on the push bar and clutch actuation lever from either side.

Robotic pod 102 also includes a latch 184A, 184B at each end. Latches 184A, 184B are preferably magnetic latches. Other robotic pods also include similar magnet latches. When robotic pod 102 is disabled another robotic pod moves up against disabled robotic pod 102 to actuate clutch mechanism 176 and move the disabled robotic pod to a service location as described above. To enable the properly functional robotic pod to pull or push the disabled robotic pod 102 along the tracks the magnet latches latch to one another such that the pair of robotic pods are connected. Latching the magnet latches enables the properly functional robotic pod to pull the disabled robotic pod 102 along the tracks. Latching the magnet latches also enables the push bar of the properly functional robotic pod to push and slide the push bar of the disabled robotic pod to actuate the clutching mechanism of the disabled robotic pod. Of course, other latches such as cabinet latches, catch and release latches, bullet fasteners, and the like may be used.

Robotic pod 102 further includes an electronics circuit associated with drive mechanism 168 to provide control over the speed and direction of drive wheels 164. The electronics circuit is operable to communicate with controller 160 for controlling robotic pod 102 and providing information regarding the robotic pod to the controller.

Figure 4:
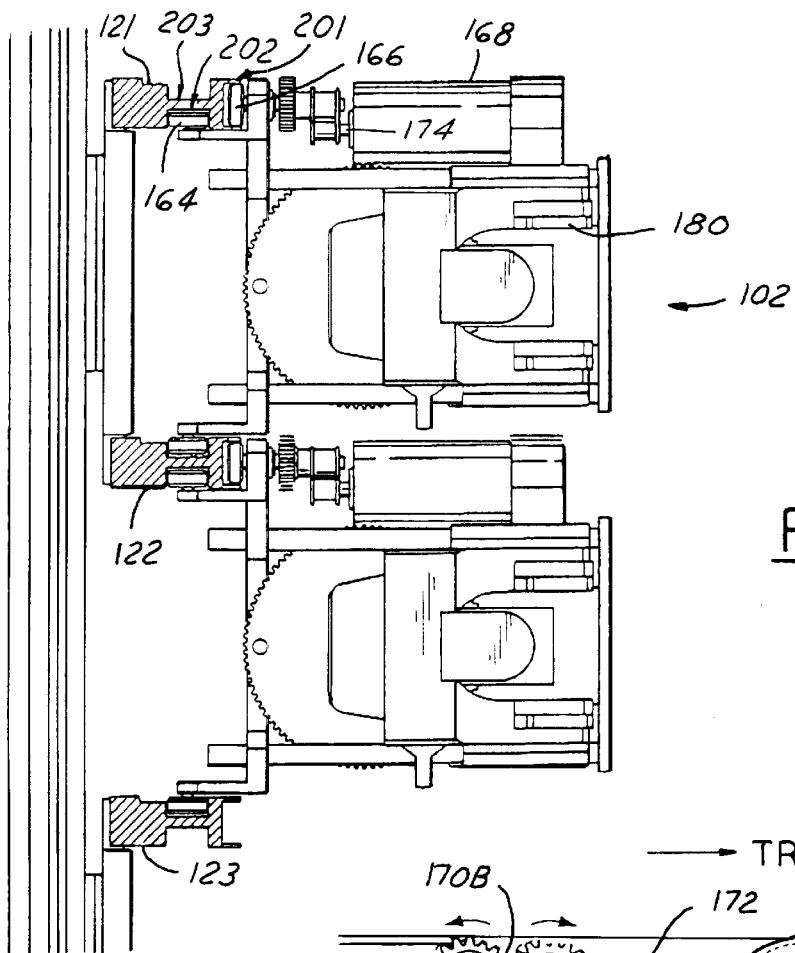
FIG. 4 illustrates a side view of two robotic mechanisms attached to the tracks of the storage library.
Figure 5:
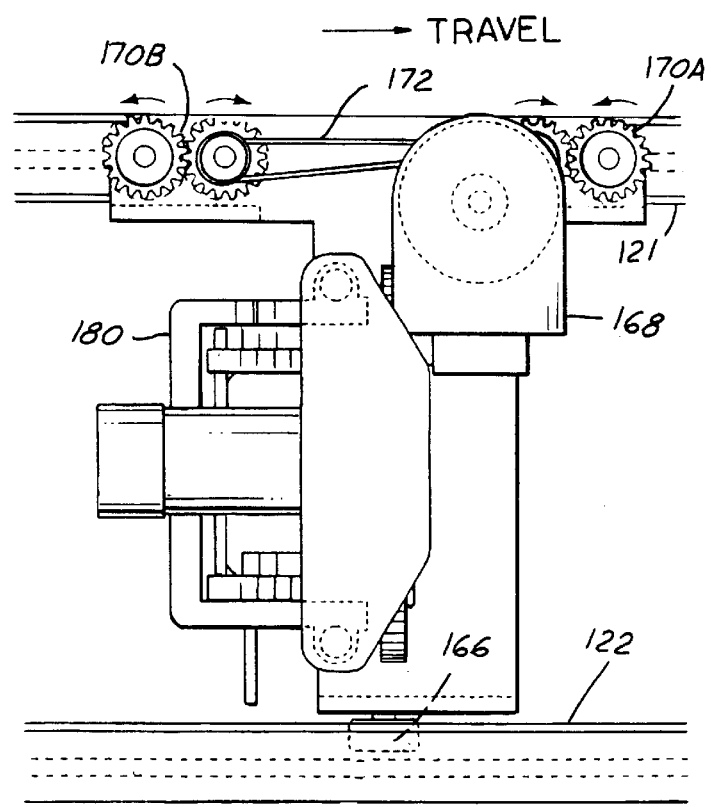
FIG. 5 illustrates a frontal view of a robotic mechanism attached to the tracks of the storage library.

Referring now to FIGS. 4 and 5, the attachment of robotic pod 102 (shown without clutch mechanism 176) to the track or rail structure of storage library 100 is detailed in a side view of FIG. 4 and a front view in FIG. 5. In tracks 121–125 the track profile is detailed to show a series of wheel or roller containment grooves 201, 202. Grooves 201, 202 are located strategically to provide for two robotic pods traveling in opposing directions to pass very close to each other on the same track 122. Drive wheels 164 are oriented with a horizontal axis to provide a friction force between the drive wheels and the tracks. Idler wheels 166, oriented with a vertical axis, maintain robotic pod 102 in lateral proximity to tracks 121, 122.

Figure 6:
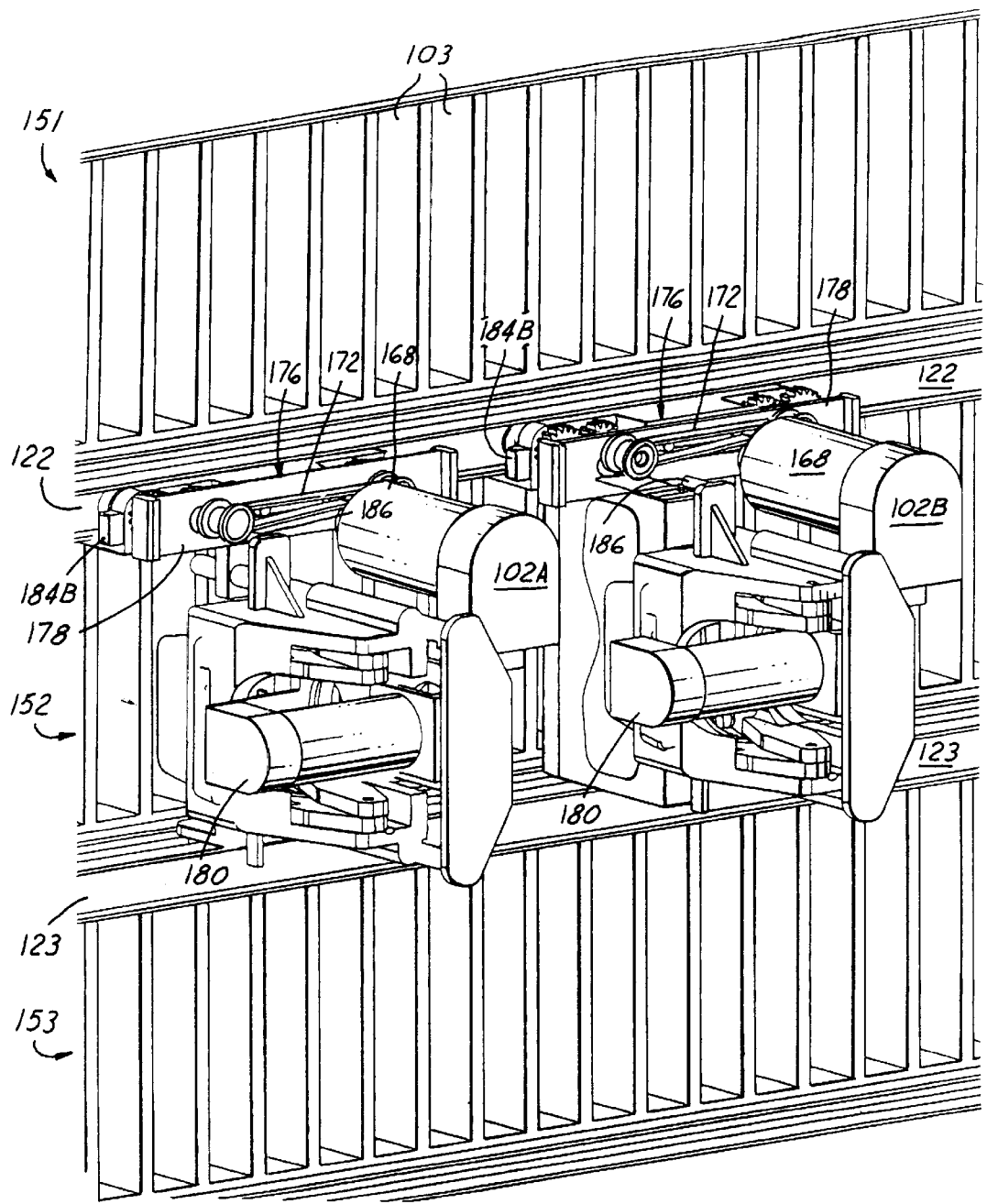
FIG. 6 illustrates an isometric view of two robotic mechanisms in close proximity to one another.

Referring now to FIG. 6, an isometric view of two robotic pods 102A, 102B in close proximity to one another is shown. When one of the robotic pods, e.g., robotic pod 102B, becomes disabled the properly functioning robotic pod 102A approaches the disabled robotic pod as shown in FIG. 6. The properly functioning robotic pod 102A may then slide push bar and clutch actuation lever 178 of disabled robotic pod 102B to actuate clutching mechanism 176 and disconnect drive mechanism 168 from drive wheels 164 thereby allowing free movement of the disabled robotic pod. The properly functioning robotic pod 102A may then latch onto disabled robotic pod 102B using magnetic latches 184A, 184B. Properly functioning robotic pod 102A may then push or pull disabled robotic pod 102B along track 122 to move the disabled robotic pod to a service area.

Figure 7:
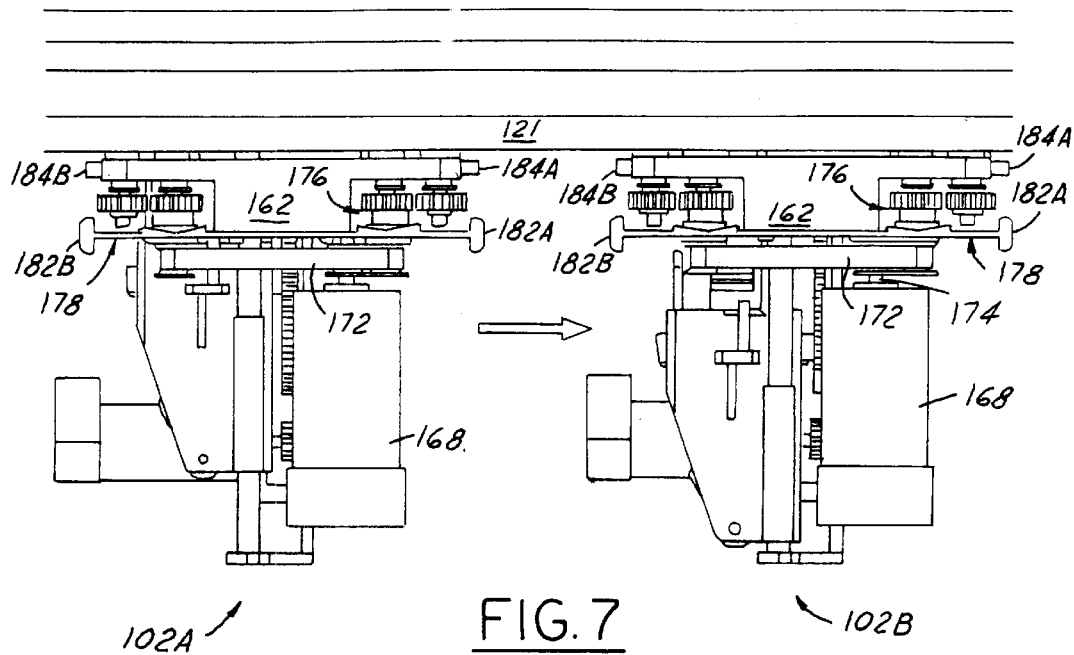
FIG. 7 illustrates an operable robotic mechanism moving towards a disabled robotic mechanism.
Figure 8:
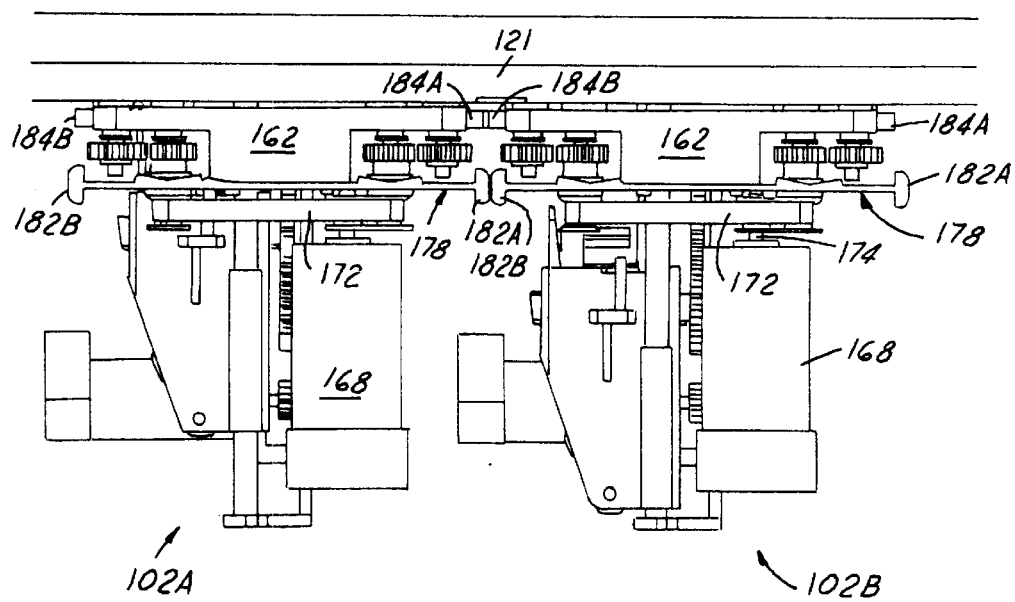
FIG. 8 illustrates the operable robotic mechanism engaging the disabled robotic mechanism for actuating the clutching mechanism of the disabled robotic mechanism.

Referring now to FIGS. 7 and 8, the operation of a properly functioning robotic pod 102A meeting a disabled robotic pod 102B to actuate the clutching mechanism 176 of the disabled robotic pod and then move the disabled robotic pod along a track 121 of storage library 100 will be described in greater detail. FIG. 7 illustrates operable robotic pod 102A moving toward disabled robotic pod 102B. Disabled robotic pod 102B is stuck on track 121 and cannot move until drive mechanism 168 is disconnected from drive wheels 164.

FIG. 8 illustrates functional robotic pod 102A engaging disabled robotic pod 102B for actuating clutching mechanism 176 of the disabled robotic pod. Disabled robotic pod 102B is stuck on track 121 and cannot move. Operable robotic pod 102A engages disabled robotic pod 102B by coming into direct contact with the disabled robotic pod. At this time, magnet latch 184A of operable robotic pod 102A engages magnet latch 184B of disabled robotic pod 102B. Pushing surface 182A of push bar 178 of operable robotic pod 102A engages pushing surface 182B of push bar 178 of disabled robotic pod 102B. Operable robotic pod 102A continues moving in the direction toward disabled robotic pod 102B causing pushing surface 182A to push on pushing surface 182B. This pushing on pushing surface 182B causes push bar 178 of disabled robotic pod 102B to slide thereby actuating clutching mechanism 168 176 of the disabled robotic pod. The actuated clutching mechanism 176 disconnects drive mechanism 168 from drive wheels 164 of disabled robotic pod 102B thereby allowing free movement of the disabled robotic pod. Operable robotic pod 102A can then continue moving toward disabled robotic pod 102B to push the disabled robotic pod along track 121 to a service location. Because magnet latches 184A and 184B are latched together, operable robotic pod 102A can also pull disabled robotic pod 102B along track 121 to a service location.

Figure 9:
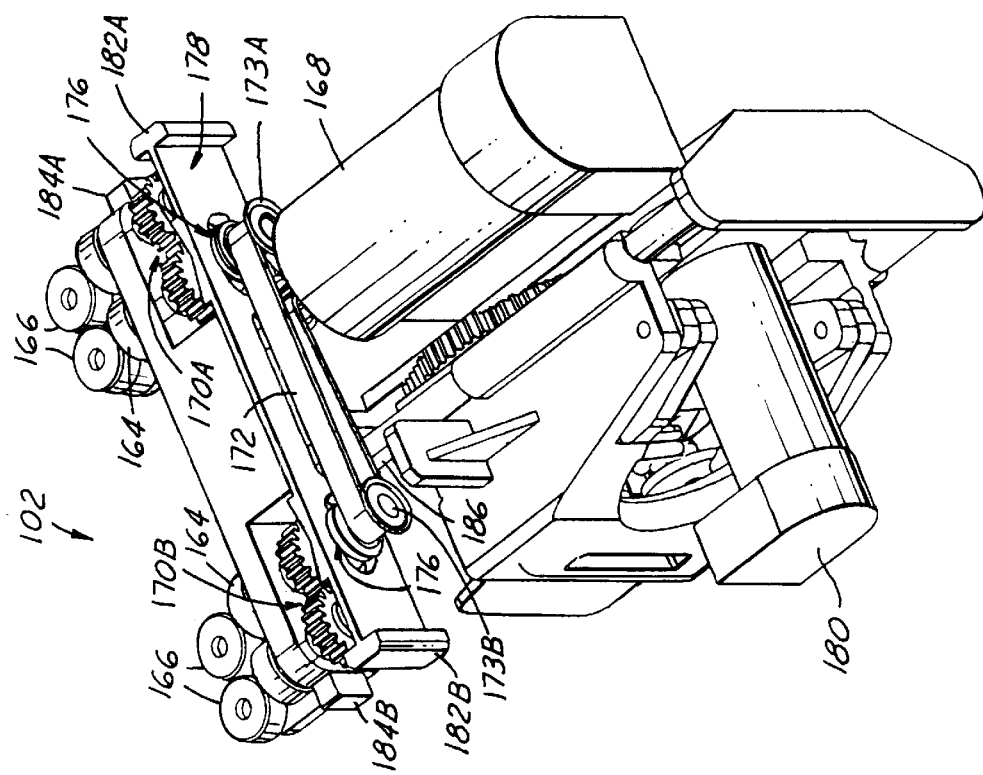
FIG. 9 illustrates a perspective view of the robotic mechanism having a gripper mechanism in a semi-extended position for serving as a locking device for sliding the push bar and clutch actuation lever of a disabled robotic mechanism.

Referring now to FIG. 9, a perspective view of robotic pod 102 having gripper mechanism 180 in a semi-extended position for serving as a locking device for sliding the push bar and clutch actuation lever of a disabled robotic pod is shown. Gripper mechanism 180 includes a locking pin 186 movable between an extended position and a retracted position. Locking pin 186 moves to the extended position to insert itself into a hole of push bar and clutch actuation lever 178 to lock the clutch actuation lever in place. Locking pin 186 secures push bar and clutch actuation lever 178 in place when push bar 178 pushes on the push bar of a disabled robotic pod. Push bar and clutch actuation lever 178 must be held in a stationary state in operable robotic pod 102 while the push bar and clutch actuation lever of a disabled robotic pod is forced to move into contact with the clutch mechanism and disengage the drive elements of the disabled robotic pod.

Figure 10:
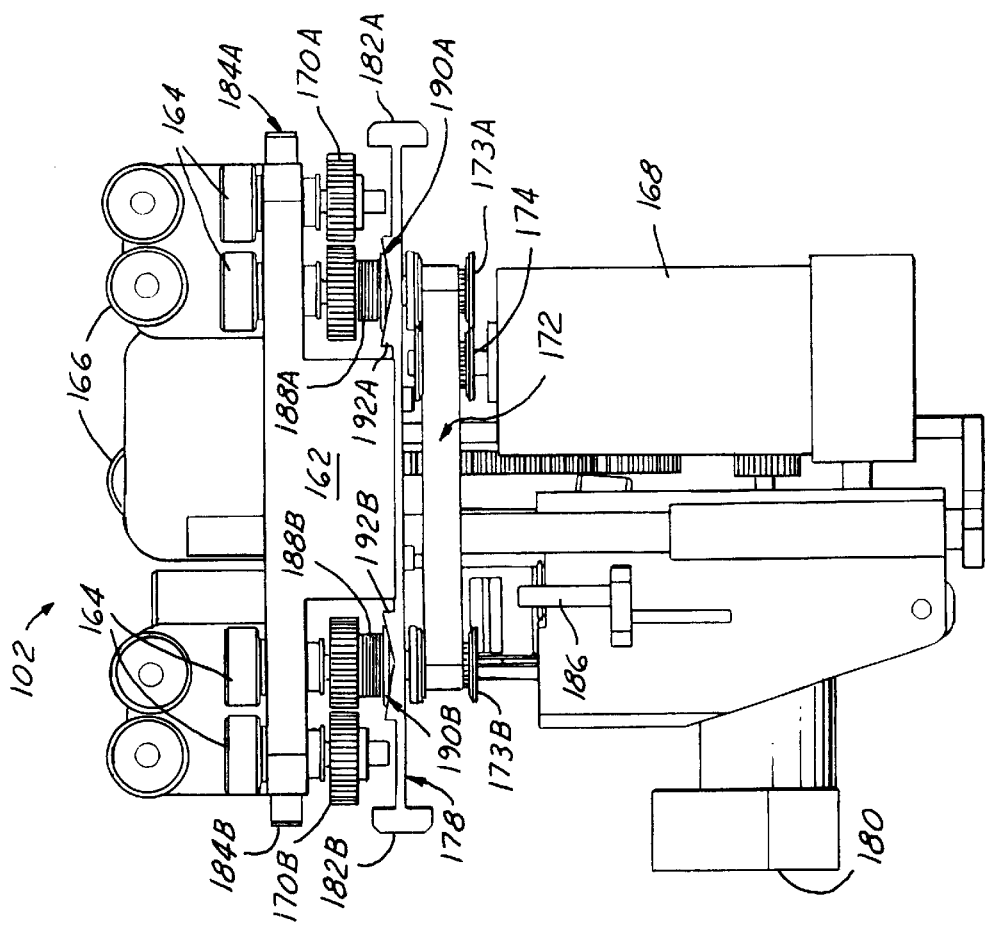
FIG. 10 illustrates a top view of the robotic mechanism showing in greater detail the clutch mechanism.

Referring now to FIG. 10, a top view of robotic pod 102 illustrating in greater detail clutch mechanism 168 is shown. Clutch mechanism 168 includes clutch engagement springs 188A, 188B and clutch friction bevels 190A, 190B positioned between drive gears 170A, 170B and push bar and actuation lever 178. Clutch friction bevels 190A, 190B mate with push bar bevels 192A, 192B on push bar and actuation lever 178 to push the clutch friction surfaces away from drive pulleys 173A, 173B thereby disconnecting the torque from the drive pulleys into drive gears 170A, 170B and drive wheels 164. In the depiction shown in FIG. 10, two clutches are used because there are two drive wheels and two more auxiliary wheels giving four wheels of total driving force.

Thus it is apparent that there has been provided, in accordance with the present invention, a method and system for decoupling driving means from driving wheels of a disabled robotic mechanism in the storage library system to enable the disabled robotic mechanism to be freely moved along the tracks that fully satisfy the objects, aims, and advantages set forth above. While the present invention has been described in conjunction with specific embodiments thereof, it is evident that many alternatives, modifications, and variations will be apparent to those skilled in the art in light of the foregoing description. Accordingly, it is intended to embrace all such alternatives, modifications, and variations as fall within the spirit and broad scope of the appended claims.

What is claimed is:

1. An automated storage library system for the storage and retrieval of media cartridges, the storage library comprising:

a plurality of media cartridge storage cells each housing a respective media cartridge;

tracks disposed adjacent to the media cartridge storage cells for enabling access to each of the media cartridge storage cells;

a first robotic mechanism operable to move on the tracks to access the media cartridges in the media cartridge storage cells, the first robotic mechanism having a plurality of drive wheels operable to ride on the tracks for moving the first robotic mechanism along the tracks, a drive mechanism for driving the drive wheels to move the first robotic mechanism along the tracks, and a clutch mechanism actuable for disconnecting the drive mechanism from the drive wheels when the drive mechanism is disabled to enable the first robotic mechanism to be moved along the tracks by an external force after the drive mechanism has been disconnected from the drive wheels, wherein the clutch mechanism includes a clutch actuation lever slidable to a disengaged position to disconnect the drive mechanism from the drive wheels; and a second robotic mechanism operable to move on the tracks, wherein the second robotic mechanism actuates the clutching mechanism by engaging the clutch actuation lever.

2. The storage library of claim 1 wherein:

the second robotic mechanism includes a push bar, wherein the push bar of the second robotic mechanism engages the clutch actuation lever of the first robotic mechanism to actuate the clutching mechanism of the first robotic mechanism.

3. The storage library of claim 1 wherein:

the first and second robotic mechanisms include magnet latches to enable the second robotic mechanism to pull the first robotic mechanism along the tracks when the clutching mechanism is actuated.

4. The storage library of claim 1 wherein:

the second robotic mechanism includes a push bar, wherein the push bar of the second robotic mechanism pushes on the first robotic mechanism to enable the second robotic mechanism to push the first robotic mechanism along the tracks when the clutching mechanism is actuated.

5. The storage library of claim 1 wherein:

the first robotic mechanism includes a plurality of drive gears operable to be driven by the drive mechanism for driving the drive wheels, wherein the clutch mechanism disconnects the drive mechanism from the drive gears to disconnect the drive mechanism from the drive wheels.

6. A method for operating an automated storage library having a plurality of media cartridge storage cells each housing a media cartridge, the method comprising:

providing a robotic mechanism having drive wheels for moving along tracks of the automated storage library to access the media cartridges in the media cartridge storage cells;

driving the drive wheels using a drive mechanism to move the robotic mechanism along the tracks;

actuating a clutch mechanism with another robotic mechanism to disconnect the drive mechanism from the drive wheels when the drive mechanism is disabled; and applying an external force on the robotic mechanism to move the robotic mechanism along the tracks after the drive mechanism has been disconnected from the drive wheels.

7. The method of claim 6 wherein:

applying an external force on the robotic mechanism includes pushing the robotic mechanism along the tracks.

8. The method of claim 6 wherein:

applying an external force on the robotic mechanism includes pulling the robotic mechanism along the tracks.

* * * * *